(12) United States Patent
Schmidt et al.

(10) Patent No.: US 7,708,257 B2
(45) Date of Patent: May 4, 2010

(54) APPARATUS FOR TREATING SOLIDS

(75) Inventors: Uwe Schmidt, Schopfheim (DE); Christian Krumbholz, Maulburg (DE); Martin Amsler, Laufenburg (DE)

(73) Assignee: Ekato Solidmix GmbH, Schopfheim (DE)

( * ) Notice: Subject to any disclaimer, the term of this patent is extended or adjusted under 35 U.S.C. 154(b) by 726 days.

(21) Appl. No.: 11/273,215

(22) Filed: Nov. 14, 2005

(65) Prior Publication Data

US 2006/0062079 A1  Mar. 23, 2006

Related U.S. Application Data

(63) Continuation of application No. PCT/EP2004/005099, filed on May 12, 2004.

(30) Foreign Application Priority Data

May 13, 2003  (DE) ............... 203 07 458 U

(51) Int. Cl.
*B01F 7/20* (2006.01)
(52) U.S. Cl. .......... 261/84; 366/304; 366/305; 366/325.1; 366/325.4; 366/329.1; 366/330.3; 366/330.7; 416/132 R; 416/223 R; 416/242
(58) Field of Classification Search .......... 366/325.1, 366/202, 304, 305, 310, 325.4, 325.5, 329.1, 366/330.1–330.5, 330.7; 416/132 R, 223 R, 416/242
See application file for complete search history.

(56) References Cited

U.S. PATENT DOCUMENTS

| 48,449 | A | * | 6/1865 | Sanborn | 366/325.5 |
|---|---|---|---|---|---|
| 59,811 | A | * | 11/1866 | Beckwith | 366/286 |
| 229,726 | A | * | 7/1880 | McAnespey | 366/343 |
| 993,784 | A | * | 5/1911 | Mattheiss | 366/149 |
| 1,116,001 | A | * | 11/1914 | Anderson | 416/237 |
| 1,870,355 | A | * | 8/1932 | Burns et al. | 34/181 |
| 2,015,397 | A | * | 9/1935 | Eppler | 366/95 |
| 2,495,865 | A | * | 1/1950 | Perkins | 99/323.9 |
| 2,517,149 | A | * | 8/1950 | Walsh et al. | 127/24 |
| 3,145,017 | A | * | 8/1964 | Thomas | 366/310 |
| 3,201,095 | A | * | 8/1965 | Erwien et al. | 366/314 |
| 3,250,519 | A | * | 5/1966 | Friedrich-Walter | 261/93 |
| 3,333,827 | A | * | 8/1967 | Lucke et al. | 366/97 |
| 3,348,816 | A | * | 10/1967 | Cox | 366/300 |
| 3,545,729 | A | * | 12/1970 | Scholl et al. | 366/314 |
| 3,622,126 | A | * | 11/1971 | Eberle | 366/327.1 |
| 4,021,024 | A | * | 5/1977 | Stasi | 366/97 |

(Continued)

FOREIGN PATENT DOCUMENTS

DE  1020856  * 12/1957

(Continued)

*Primary Examiner*—David L Sorkin
*Assistant Examiner*—Andrew Janca
(74) *Attorney, Agent, or Firm*—Henry M. Feiereisen; Ursula B. Day

(57) ABSTRACT

Apparatus for treating solids, in particular mixing, pelletizing or drying, includes a vessel receiving a solid product, and a driveshaft which is arranged in the vessel. Disposed in fixed rotative engagement with the driveshaft is at least one mixing member which rotates in a rotation direction and has two mixing arms. Each mixing arm includes a main vane of generally triangular cross section to define an apex which is directed in the rotation direction of the mixing member.

22 Claims, 4 Drawing Sheets

U.S. PATENT DOCUMENTS

| | | | | |
|---|---|---|---|---|
| 4,091,457 A * | 5/1978 | Slywka | | 366/304 |
| 4,277,183 A * | 7/1981 | Shinriki | | 366/98 |
| 4,366,123 A * | 12/1982 | Kato et al. | | 422/135 |
| 4,515,483 A * | 5/1985 | Muller et al. | | 366/303 |
| 4,544,281 A * | 10/1985 | Wilkinson | | 366/330.1 |
| 4,552,461 A * | 11/1985 | Ott et al. | | 366/279 |
| 4,722,608 A * | 2/1988 | Salzman et al. | | 366/330.5 |
| 4,748,219 A * | 5/1988 | Gordini | | 526/88 |
| 4,802,771 A * | 2/1989 | Weetman | | 366/270 |
| 4,844,355 A | 7/1989 | Kemp, Jr. et al. | | |
| 4,893,990 A * | 1/1990 | Tomohiro et al. | | 416/228 |
| 4,896,971 A * | 1/1990 | Weetman et al. | | 366/330.2 |
| 4,917,546 A * | 4/1990 | Bulicz | | 406/123 |
| 4,941,750 A | 7/1990 | Bouchez et al. | | |
| 5,090,815 A | 2/1992 | Bohle | | |
| 5,163,357 A * | 11/1992 | Felknor et al. | | 99/323.5 |
| 5,249,861 A * | 10/1993 | Thomson | | 366/194 |
| 5,326,168 A * | 7/1994 | Miura | | 366/343 |
| 5,339,998 A * | 8/1994 | Warren | | 222/241 |
| 5,415,474 A * | 5/1995 | Nelson et al. | | 366/139 |
| 5,577,675 A * | 11/1996 | Ishikawa | | 241/65 |
| 5,607,235 A * | 3/1997 | Campbell | | 366/325.2 |
| 5,655,834 A * | 8/1997 | Dickson | | 366/205 |
| 6,096,228 A * | 8/2000 | Angelle | | 210/803 |
| 6,193,408 B1 * | 2/2001 | Miura et al. | | 366/304 |
| 6,334,705 B1 * | 1/2002 | Weetman | | 366/330.1 |
| 6,439,756 B1 * | 8/2002 | Forschner et al. | | 366/102 |
| 6,508,423 B2 * | 1/2003 | Gloor | | 241/57 |
| 6,612,733 B2 * | 9/2003 | Schmidt et al. | | 366/310 |
| 6,652,137 B1 * | 11/2003 | Bosch et al. | | 366/288 |
| 6,854,876 B2 * | 2/2005 | Dickson, Jr. | | 366/205 |
| 6,863,432 B2 * | 3/2005 | Schuchardt et al. | | 366/299 |
| 7,401,974 B2 * | 7/2008 | Himmelsbach | | 366/330.3 |
| 2001/0019515 A1 * | 9/2001 | Schmidt et al. | | 366/310 |
| 2003/0063521 A1 * | 4/2003 | Kumar et al. | | 366/314 |
| 2003/0064310 A1 * | 4/2003 | Kumar et al. | | 430/108.1 |
| 2003/0147304 A1 * | 8/2003 | Schuchardt et al. | | 366/299 |
| 2004/0213082 A1 * | 10/2004 | Tobler | | 366/325.4 |
| 2006/0187750 A1 * | 8/2006 | Aldrich et al. | | 366/270 |
| 2006/0219100 A1 * | 10/2006 | Gelfand | | 99/348 |
| 2008/0008029 A1 * | 1/2008 | Katz et al. | | 366/330.3 |
| 2008/0112812 A1 * | 5/2008 | Duong | | 416/223 R |
| 2009/0041583 A1 * | 2/2009 | Saitou | | 416/182 |
| 2009/0114616 A1 * | 5/2009 | White et al. | | 215/307 |
| 2009/0148290 A1 * | 6/2009 | Garver | | 416/146 R |

FOREIGN PATENT DOCUMENTS

| | | | |
|---|---|---|---|
| DE | 10248333 A1 * | 4/2003 | |
| EP | 598253 A1 * | 5/1994 | |
| GB | 2126491 A * | 3/1984 | |
| JP | 53093407 A * | 8/1978 | |
| JP | 58057082 A * | 4/1983 | |
| JP | 02303805 A * | 12/1990 | |
| JP | 06166019 A * | 6/1994 | |
| WO | WO 2004101127 A1 * | 11/2004 | |
| WO | WO 2005000455 A1 * | 1/2005 | |

* cited by examiner

APPARATUS FOR TREATING SOLIDS

CROSS-REFERENCES TO RELATED APPLICATIONS

This application is a continuation of prior filed copending PCT International application no. PCT/EP2004/005099, filed May 12, 2004, which designated the United States and on which priority is claimed under 35 U.S.C. §120, and which claims the priority of German Patent Application, Serial No. 203 07 458.0, filed May 13, 2003, pursuant to 35 U.S.C. 119(a)-(d), the subject matter of which are incorporated herein by reference.

BACKGROUND OF THE INVENTION

The present invention relates, in general, to an apparatus for treating solids, in particular mixing, pelletizing or drying of solids.

It would be desirable and advantageous to provide an improved apparatus for treating solids to enhance the quality during treatment.

SUMMARY OF THE INVENTION

According to one aspect of the present invention, an apparatus for treating solids, in particular mixing, pelletizing or drying, includes a vessel receiving a solid product, a driveshaft disposed in the vessel, at least one mixing member rotating in a rotation direction and disposed in fixed rotative engagement with the driveshaft, wherein the mixing member has two mixing arms, each including a main vane of generally triangular cross section to define an apex which is directed in the rotation direction of the mixing member.

According to another feature of the present invention, the mixing arm may have a bottom vane of generally rectangular cross section to extend the main vane in a direction of the vessel bottom.

According to another feature of the present invention, a generally cylindrical rod may be provided for mounting the bottom vane in fixed rotative engagement with the driveshaft.

According to another feature of the present invention, the mixing arm may include an end vane disposed at an upper end of the main vane and having a generally rectangular cross section.

According to another feature of the present invention, the main vane may extend in relation to a rotation plane at an angle ranging from 15° to 60°. The same angle arrange may be applicable for the bottom vane and the end vane.

According to another feature of the present invention, the end vane and the main vane and the bottom vane may each extend in relation to an inner wall of the vessel at a clearance angle ranging from 1° to 30°.

According to another feature of the present invention, the end vane may extend in relation to a radial at an angle of inclination ranging from 1° to 30°.

According to another feature of the present invention, the bottom vane and the cylindrical rod of each of the mixing arms may form jointly a generally Z-shaped configuration.

According to another feature of the present invention, the end vane and the main vane and the bottom vane may each extend in relation to an inner wall of the vessel at a distance of about 1 to 10 mm.

According to another feature of the present invention, at least one baffle may be disposed in the vessel for disturbing the flow of the solid product. Suitably, the baffle may have a generally circular cross section and may be chamfered in flow direction.

According to another feature of the present invention, a chopper (dispersing member) may be provided for subjecting the product in the vessel to high shear forces. Suitably, the chopper may have a shaft for attachment of several blades.

According to another feature of the present invention, a gassing device may be mounted in the bottom of the vessel for introducing a gas, e.g. air, into the vessel in flow direction of the product being treated.

According to another feature of the present invention, the vessel may have a flat bottom, a cylindrical wall, and a curved transition between the bottom and the cylindrical wall. Suitably, the transition is defined by a radius of about (0.05 to 0.2)×D, wherein D is an inner diameter of the vessel.

According to another feature of the present invention, the bottom vane may have a height of about (0.1 to 0.3)×D. The main vane may have a height of about (0.2 to 0.5)×D.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1A:
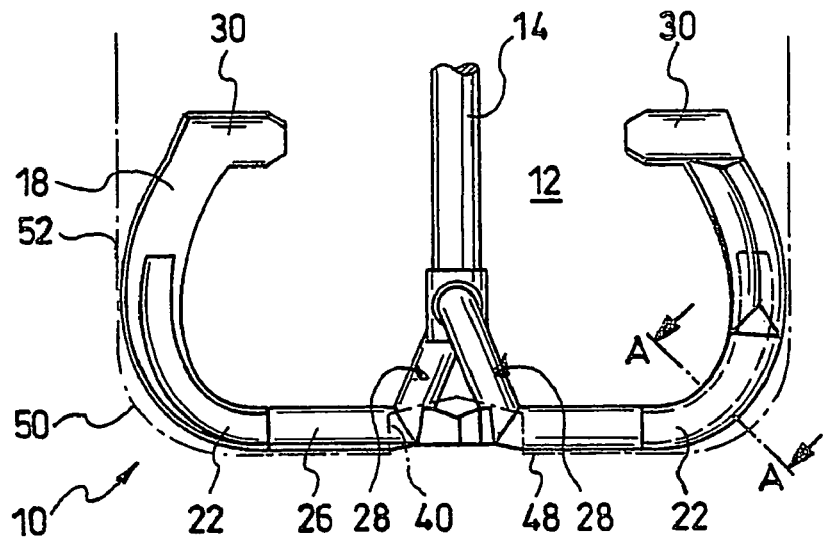
FIG. 1A is a side view of a mixing member of an apparatus for treating solids in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1A, there is shown a side view of an apparatus for treating solids in accordance with the present invention, generally designated by reference numeral 10. The treatment apparatus 10 includes a mixing vessel 12 having a flat bottom 48, a cylindrical skirt 52 and a transition 50 between the bottom 48 and the skirt 52. The transition 50 has a radius of about (0.05 to 0.2)×inner diameter D of the vessel 12. The cylindrical skirt 52 of the vessel 12 has a height $H_S$ which at a maximum is equal to the diameter thereof. The treatment apparatus 10 may be closed on top by a flat lid (not shown) or arched lid (not shown). The vessel 12 may be double-jacketed and/or provided with an attached filter.

Figure 1E:
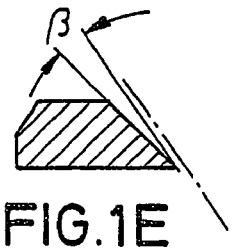
FIG. 1E is a sectional view of the mixing member, taken along the line A-A in FIG. 1A.
Figure 1B:
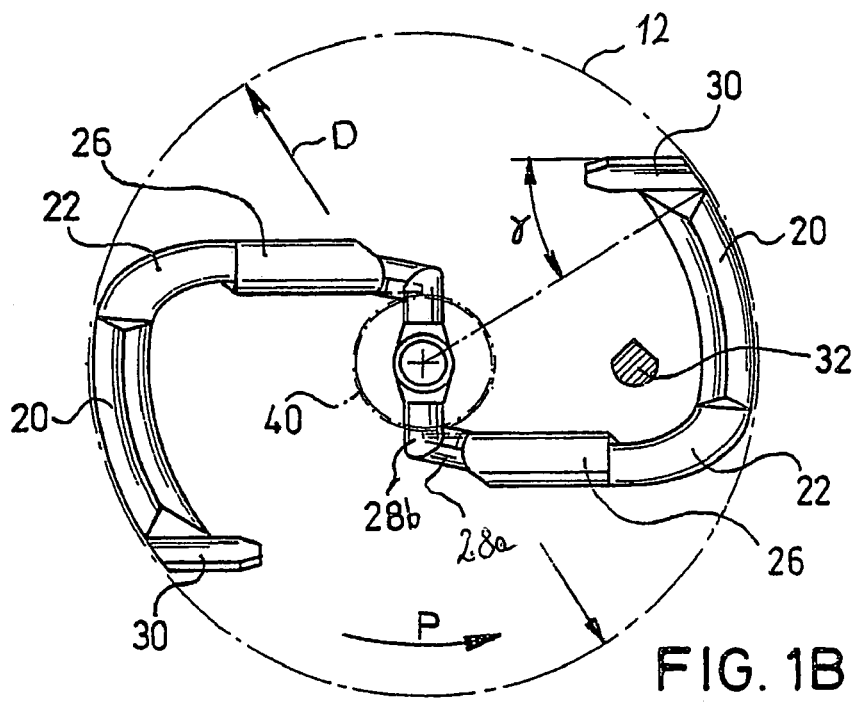
FIG. 1B is a top plan view of the mixing member.
Figure 1C:
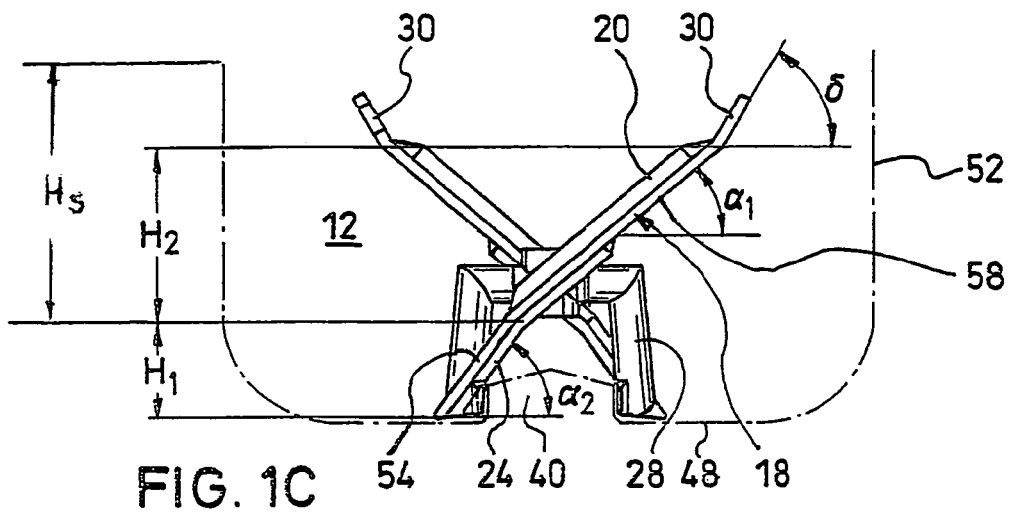
FIG. 1C is another side view of the mixing member.
Figure 1D:
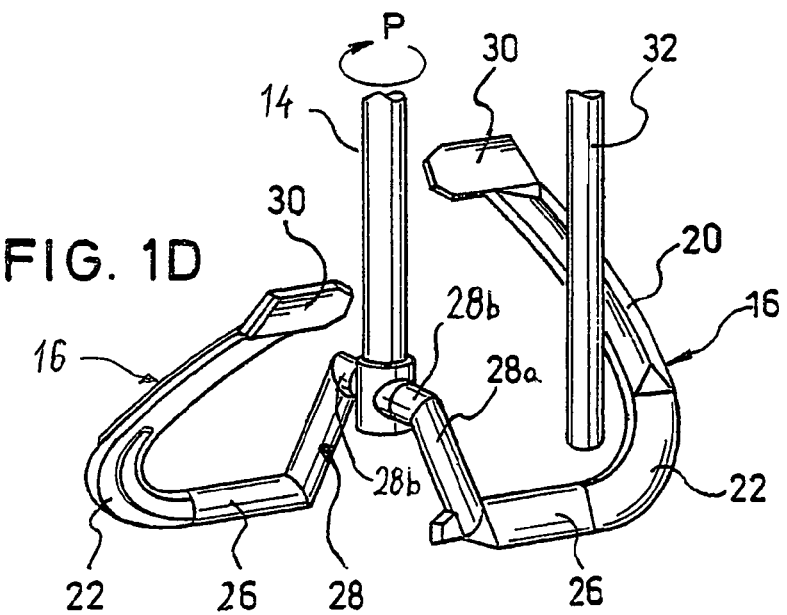
FIG. 1D is a perspective view of the mixing member.

Disposed in the vessel 12 is a mixing or agitating unit which includes a free-floating driveshaft 14 without bottom support, whereby the driveshaft 14 is driven from atop for rotation about a rotation direction indicated by arrow P (FIG. 1D). Connected in fixed rotative engagement to the driveshaft 14 is a mixing member which is shown here by way of example in the form of two mixing arms 16 which oppose one another diametrically. Each mixing arm 16 includes a main vane 18 of, for example, rectangular cross section, which extends at a slight distance from the bottom 48 upwards, as shown in particular in FIGS. 1A and 1C. FIG. 1C also illustrates the kinked configuration of the main vane 18 to define a lower vane portion 54 and an upper vane portion 58. The lower vane portion 54 has a height $H_1$ of about $(0.1$ to $0.3)\times$ diameter D of the vessel 12, whereas the upper vane portion 58 has a height $H_2$ of about $(0.2$ to $0.5)\times$diameter D of the vessel 12. The heights $H_1$, $H_2$ are hereby measured parallel to the center axis of the driveshaft 14. The upper vane portion 58 of the main vane 18 extends in relation to the rotation plane at an angle $\alpha_1$ of about 15° to 60°, whereas the lower vane portion 54 of the main vane 18 extends in relation to the rotation plane at an angle $\alpha_2$ of about 15° to 60°. Angles $\alpha_1$ and $\alpha_2$ may be identical or different, and angle $\alpha_2$ may be greater or smaller than angle $\alpha_1$.

Placed upon the upper vane portion 58 of the main vane 18 is a triangular rail 20 which may be formed in one piece with the main vane 18 or suitably secured thereto, and which extends along the entire length of the upper vane portion 58, as shown in FIGS. 1C and 1D. The triangular rail 20 has a base area, which faces the main vane 18, and an apex 21 which is directed in rotation movement of the mixing member. The lower vane portion 54 of the main vane 18 is reinforced by a rail 24 which is configured to extend beyond the lower vane portion 54 to also cover part of the upper vane portion 58, as shown in FIG. 1C.

Disposed upon the upper end of the main vane 18 is an end vane 30 which is suitably formed in one piece with the main vane 18. As shown in FIG. 1B, the end vane 30 extends inwardly from the inner wall of the vessel 12 and is inclined in relation to a radial upon the vessel wall at an angle γ ranging from about 1° to 30°. As shown in FIG. 1C, the end vane 30 extends in relation to the rotation plane at an angle δ ranging from about 15° to 60°. The end vane 30 is constructed in the form of a flat sheet.

The main vane 18 and the reinforcement rail 24 jointly form a curved bottom vane 22, as shown in FIGS. 1A, 1B and 1D. The bottom vane 22 terminates in an adapter piece 26 which extends substantially parallel to the bottom 48 and in turn terminates in a cylindrical rod 28 by which a connection of the mixing arm 16 with the driveshaft 14 is established and which transmits the torque as introduced by the driveshaft 14. The adapter piece 26 thus forms the transition between the flat rectangular bottom vane 22 and the cylindrical rod 28.

As best seen in FIG. 1B, the upper vane portion 58 and the triangular rail 20 as well as the leading edge of the end vane 30 extend along the inner wall of the vessel 12, whereas the bottom vane 22 is configured to conform to the curvature of the transition zone 50 of the vessel 12, as shown in FIG. 1A, and the adapter piece 26 extends substantially parallel to the bottom 48 of the vessel 12. The main, bottom and end vanes 18, 22 30 extend in relation to the bottom wall at a clearance angle β ranging from about 1° to 30°, as shown in FIG. 1E, which illustrates a section through the bottom vane 22 along the line A-A in FIG. 1A.

The distance of the main, bottom and end vanes 18, 22, 30 as well as the adapter piece 26 from the wall and bottom 48, respectively, of the vessel 12 is minimal and ranges from about 1 to 10 mm.

In the illustrated exemplified embodiment, the cylindrical rod 28 is made of two sections 28a, 28b, i.e. a first section 28a which extends generally upwards from the adapter piece 26, and a second section 28b which extends generally transversely to the axis of the driveshaft 14, as best seen in FIG. 1D. Of course, the rod 28 may be constructed differently so long as it is capable to transmit the torque from the driveshaft 14 to the mixing arms 16.

As shown in FIG. 1B, the bottom vanes 22, adapter pieces 26 and the rods 28 of both mixing arms 16 jointly exhibit a Z-shaped configuration so that the vessel content (product) being treated is moved radially outwards even when the rotation speed of the driveshaft 14 in rotation direction P is slight. As a consequence, the vessel 12 can effectively being emptied completely via an outlet valve (not shown) disposed on the outer perimeter of the vessel 12.

The treatment apparatus 10 may suitably be provided with at least one baffle 32 for disturbing a flow of the product in the vessel 12. The baffle 32 has a generally cylindrical base body chamfered or cut in flow direction and is installed eccentrically in the vessel 12 from atop in parallel relationship to the driveshaft 14. The provision of the baffle 32 causes a reduced rotation motion in the product and causes larger lumps, forming during drying, to move towards the mixing member where they are crushed.

Figure 2:
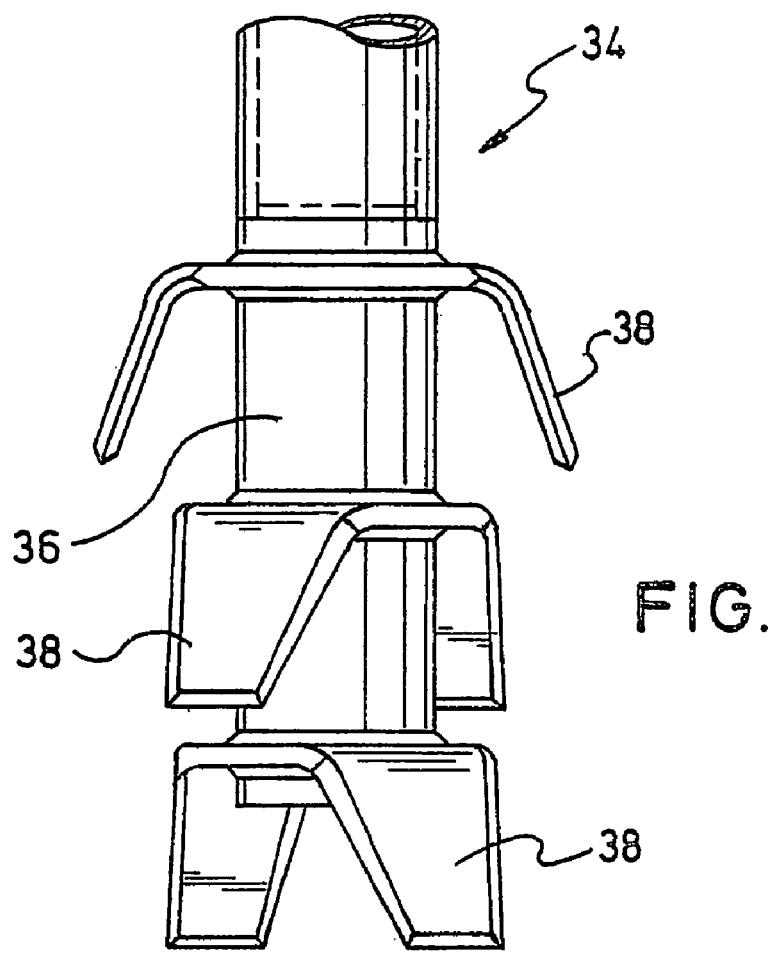
FIG. 2 is an illustration of a dispersing element with blades for use in the apparatus for treating solids in accordance with the present invention.
Figure 3:
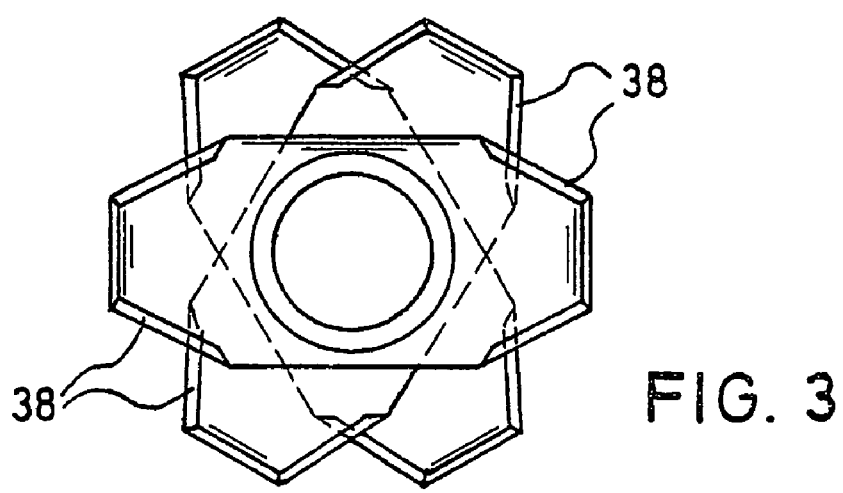
FIG. 3 is a top plan view of the dispersing element.

In addition, the treatment apparatus 10 may include a dispersing member in the form of a chopper 34 which is mounted onto the lid of the vessel 12. An example of a chopper 34 is shown in FIG. 2. The chopper 34 includes a shaft 36 which is installed eccentrically from atop into the vessel 12 between the driveshaft 14 and the main vane 18 in substantial parallel relationship to the driveshaft 14 and ends slightly above the rod 28. The shaft 36 has a lower end for attachment of at least one, preferably several, such as three, blades 38 which are arranged above one another and staggered at an angle of 60° in circumferential direction, as shown in FIG. 3. The chopper 35 operates at high circumferential speed, e.g. greater than 15 m/s so as to introduce locally high shear forces into the product. As a consequence, lumps and chunks in the product are split. Depending on the product being treated, the blades 38 may, of course, be constructed in a different way in order to adjust the shearing action to the product characteristics at hand.

Figure 4:
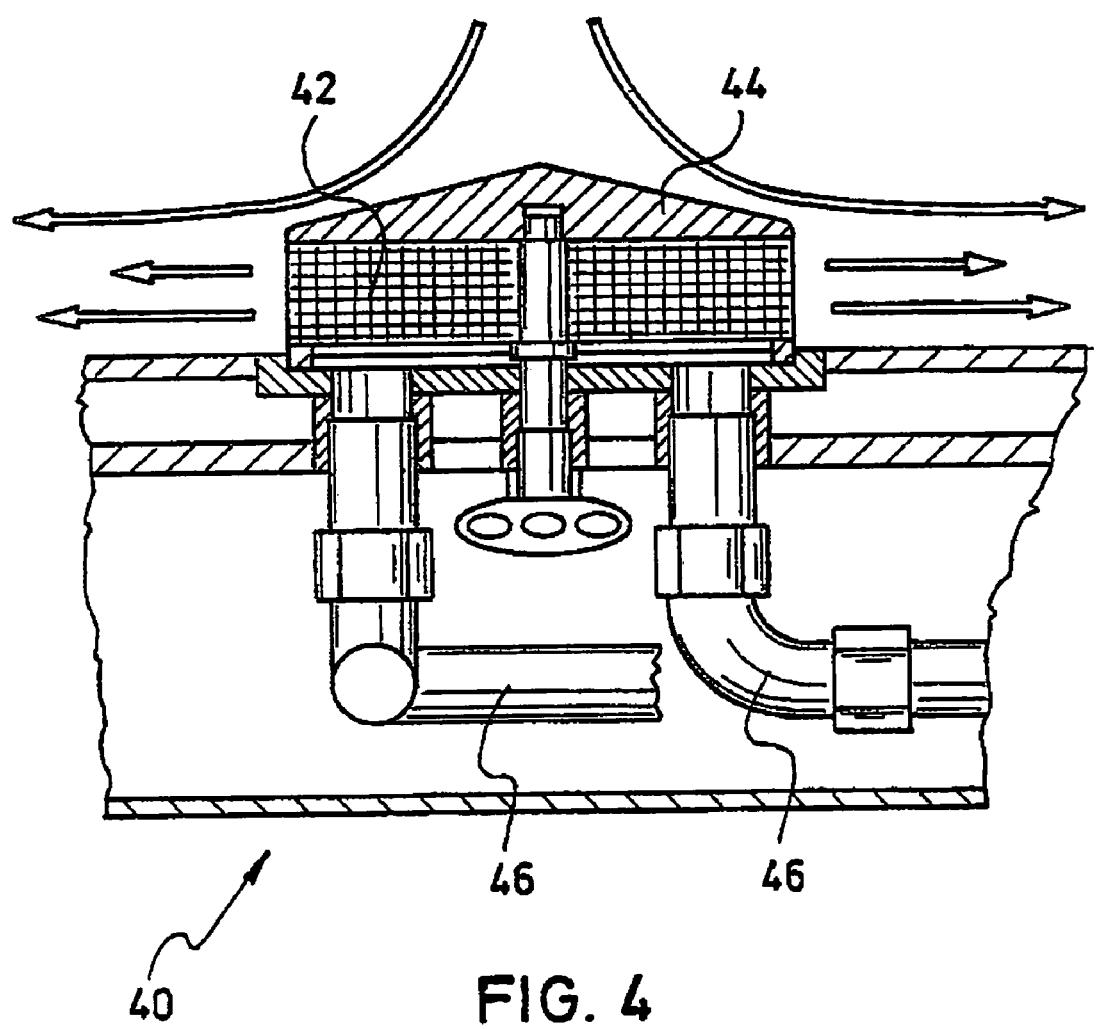
FIG. 4 is a sectional view of a gassing device for introduction of gas into the vessel of the apparatus for treating solids in accordance with the present invention.

As shown in FIGS. 1A and 1C, a gassing device 40 is installed in the bottom 48 of the vessel 12. An example of a gassing device 40 is shown in more detail in FIG. 4. The gassing device 40 includes a generally cylindrical base body 42, which is made of metallic filter cloth, and a conical top 44 placed upon the base body 42. At least one feed line 46 supplies gas, e.g. air, to the base body 42 from which the gas is directly conducted into the vessel 12 in flow direction of the vessel content. As a result, gas is distributed across the entire cross section of the vessel 12 and rises over the entire vessel height. This even gas distribution results in a high phase interface between gas and solid matter.

The treatment apparatus 10 is primarily used for mixing, pelletizing and drying of solids. It may also be applicable for heating or cooling solids. In some cases, several process steps may be executed successively, e.g., chemical reactions, evaporation of solvents, crystallization by evaporation or cooling.

The mixing member has a geometry which can be realized by obliquely intersecting a cylinder so that the vane receives elliptic outer and inner contours and thus need not be connected. The triangular profile of the main vane 18 prevents solid matter to adhere to areas directed in flow direction. Moreover, part of the product being moved axially upwards is pushed in the direction toward the wall through a gap between the mixing arms 16 and the vessel wall and thus is compacted to form stable pellets.

The end vanes 30 ensure a transport of the solid matter to the center. Also the geometry of the end vane 30 is realized by an oblique cut through the cylindrical vessel part. The leading sheet edge of the end vane 30 has a constant distance to the cylindrical wall of the vessel 12 and has an elliptic configuration.

The bottom blade 22 and the adapter piece 26 are provided to compact the pellets between the bottom 49 of the vessel 12 and the mixing arms 16 and to discharge the finished product.

The narrow gap between the vanes and the inner wall of the vessel 12 substantially prevents wall deposits and incrustation and thus ensures good heat transmission coefficients.

The solids in the vessel 12 are moved axially upwards along the vessel wall and forced at the top to the center. From there, the solids are drawn in the middle downwards by the mass flow so as to establish a large mixing motion which is free of dead spaces and thereby ensures short mixing times and high heat transfers.

The shear intensity of the mixing member can be influenced by the selection of the rotation speed. When the rotation speed is high, the mixing member is appropriate for pelletizing in view of the many shear gaps in immediate proximity of the vessel wall. In this case, the various powdery components are compacted and compressed together with a binder solution in the gaps. As a result, the pellets have a stable structure. At mean rotation speed, the circumferential speed is high enough to cause shear forces, generated by the main vane 18, to breakup lumps or chunks that tend to disintegrate easily. Lumps that exhibit less tendency to disintegrate can be split through installation of baffles 32. Lumps that show even greater resistance to disintegration can be crushed through installation of the chopper 34. At low rotation speed, the content in the vessel 12 can be circulated substantially in the absence of any shearing action to thereby quickly dry pellets that are extremely sensitive to shearing.

The treatment apparatus 10 can be constructed without bottom support so that the need for seals is eliminated. The treatment apparatus is easily accessible and the vessel 12 can be essentially emptied completely, without tilting the vessel 12, as a result of the configuration of the mixing member and the narrow wall spacing between the vanes and the inner vessel wall. The treatment apparatus allows even wetting of the product surface, even distribution of binder solution, and essentially full pelletizing.

The conical configuration of the top 44 of the gassing device 40 prevents product deposits when the circumferential speed is low. The large discharge cross section from the cylindrical base body 42 of the gassing device 40 provides low gas velocities and even gas distribution. Gas flows hereby in a same direction as the solids through the mixing member, thereby realizing an optimum distribution in the entire vessel cross section. Moreover, the low circumferential speed reduces power consumption while still achieving superior results.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for treating solids, comprising:
   a vessel receiving a solid product and having a bottom;
   a driveshaft disposed in the vessel;
   at least one mixing member rotating in a rotation direction and disposed in fixed rotative engagement with the driveshaft, said mixing member having two mixing arms, each said mixing arm including
      a main vane of generally triangular cross section to define an apex which is directed in the rotation direction of the mixing member,
      a bottom vane extending the main vane in a direction of the bottom and having a generally rectangular cross section,
      an adapter piece extending the bottom vane and terminating in a generally cylindrical rod of L-shaped configuration to connect the mixing arm to the driveshaft and to transmit a torque from the driveshaft to the mixing arm; and
      an end vane disposed at an upper end of the main vane and having a generally rectangular cross section, said end vane extending inwardly from an inner wall of the vessel and formed in one piece with the main vane.

2. The apparatus of claim 1, wherein the cylindrical rod connects the bottom vane in fixed rotative engagement with the driveshaft.

3. The apparatus of claim 1, wherein the main vane extends in relation to a rotation plane at an angle ranging from 15° to 60°.

4. The apparatus of claim 1, wherein the bottom vane extends in relation to a rotation plane at an angle ranging from 15° to 60°.

5. The apparatus of claim 1, wherein the end vane extends in relation to a rotation plane at an angle ranging from 15° to 60°.

6. The apparatus of claim 1, wherein the main vane has an upper end and a lower end, said mixing arm including an end vane connected to the upper end of the main vane, and a bottom vane connected to the lower end of the main vane, said end vane and said main vane and said bottom vane extending in relation to an inner wall of the vessel at a clearance angle ranging from 1° to 30°.

7. The apparatus of claim 1, wherein the end vane extends in relation to a radial at an angle of inclination ranging from 1° to 30°.

8. The apparatus of claim 1, wherein the adapter piece and the cylindrical rod of each of the mixing arms form jointly a generally Z-shaped configuration.

9. The apparatus of claim 1, wherein the main vane has an upper end and a lower end, said mixing arm including an end vane connected to the upper end of the main vane, and a bottom vane connected to the lower end of the main vane, said end vane and said main vane and said bottom vane extending in relation to an inner wall of the vessel at a distance of about 1 to 10 mm.

10. The apparatus of claim 1, further comprising at least one baffle disposed in the vessel.

11. The apparatus of claim 10, wherein the baffle has a generally circular cross section and chamfered in flow direction.

12. The apparatus of claim 1, further comprising a chopper for subjecting the product in the vessel to high shear forces.

13. The apparatus of claim 12, wherein the chopper has a shaft for attachment of several blades.

14. The apparatus of claim 1, wherein the vessel has a bottom, and further comprising a gassing device mounted in the bottom of the vessel.

15. The apparatus of claim 14, wherein the gassing device is constructed to introduce a gas into the vessel in flow direction of the product.

16. The apparatus of claim 15, wherein the gas is air.

17. The apparatus of claim 1, wherein the vessel has a flat bottom, a cylindrical wall, and a curved transition between the bottom and the cylindrical wall.

18. The apparatus of claim 17, wherein the transition is defined by a radius of about (0.05 to 0.2)×D, wherein D is an inner diameter of the vessel.

19. The apparatus of claim 10, wherein the bottom vane has a height of about (0.1 to 0.3)×D, wherein D is an inner diameter of the vessel.

20. The apparatus of claim 1, wherein the main vane has a height of about (0.2 to 0.5)×D, wherein D is an inner diameter of the vessel.

21. The apparatus of claim 1, wherein the adapter piece extends substantially parallel to the bottom.

22. The apparatus of claim 1, further comprising a reinforcement placed coextensively upon the main vane.

* * * * *